(12) United States Patent
Fuehrer et al.

(10) Patent No.: US 7,260,609 B2
(45) Date of Patent: Aug. 21, 2007

(54) METHOD AND COMMUNICATION SYSTEM FOR DATA EXCHANGING DATA BETWEEN USERS OF A BUS SYSTEM

(75) Inventors: Thomas Fuehrer, Gerlingen (DE); Bernd Mueller, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 579 days.

(21) Appl. No.: 10/451,558

(22) PCT Filed: Dec. 21, 2001

(86) PCT No.: PCT/DE01/04853

§ 371 (c)(1),
(2), (4) Date: Dec. 22, 2003

(87) PCT Pub. No.: WO02/054252

PCT Pub. Date: Jul. 11, 2002

(65) Prior Publication Data

US 2004/0083272 A1    Apr. 29, 2004

(30) Foreign Application Priority Data

Dec. 28, 2000 (DE) ................................ 100 65 113

(51) Int. Cl.
*G06F 15/16* (2006.01)
(52) U.S. Cl. ...................... 709/207; 709/232; 709/253; 370/395.42
(58) Field of Classification Search ................ 709/206, 709/207, 253, 200–202, 220–234; 370/395.42, 370/455

See application file for complete search history.

(56) References Cited

U.S. PATENT DOCUMENTS

| 4,295,122 A | * | 10/1981 | Hatada et al. ............... 710/111 |
| 5,452,419 A | * | 9/1995 | Di Giulio et al. ........... 709/200 |
| 6,108,683 A | * | 8/2000 | Kamada et al. ............. 718/103 |
| 6,944,182 B1 | * | 9/2005 | Amagai et al. ............. 370/466 |

OTHER PUBLICATIONS

M. A. Livani, J. Kaiser, W. J. Jia: "Scheduling Hard and Soft Real-Time Communication in the Controller Area Network" [Online] 1998, 23rd IFAC/IFIP Workshop on Real Time Programming 23rd IFAC/IFIP Workshop on Real Time Programming XP002235284 found at Internet: <URL: http://www.informatik.uni-ulm.de/rs/projek te/core/> [found on Mar. 19, 2003] paragraph [0004].

(Continued)

*Primary Examiner*—Moustafa Meky
(74) *Attorney, Agent, or Firm*—Kenyon & Kenyon LLP

(57) ABSTRACT

The present invention provides a method and a communications system for the exchange of data between at least two users who are in contact with one another using a bus system. The data are included in messages which are transmitted by users over the bus system. A specifiable priority is assigned to each message. In order to achieve, in the normal case, a high probability of a short latency period (t) of a message to be transmitted, and to be able to guarantee, in the worst case, a maximum latency period ($t_{max}$), it is provided that the priorities assigned to the messages be dynamically modified during the operation of bus system. Preferably, the set of all messages is subdivided into equivalence classes, and a priority is assigned to each equivalence class. During the operation of the bus system, the priorities of the messages are dynamically modified within an equivalence class, and the priorities of the equivalence classes are dynamically modified.

18 Claims, 5 Drawing Sheets

OTHER PUBLICATIONS

M. A. Livani, J. Kaiser: "EDF Consensus on CAN Bus Access for Dynamic Real-Time Applications" José Rolim (Ed.): Lexture Notes in Computer Science, [Online] Nr. 1388, 1998, pp. 1088-1097, XP002235283 found at Internet: <URL:http://www.informatik.uni-ulm.de/rs/p rojekte/core/> [found on Mar. 19, 2003] paragraphs [0004], [0005].

* cited by examiner

METHOD AND COMMUNICATION SYSTEM FOR DATA EXCHANGING DATA BETWEEN USERS OF A BUS SYSTEM

FIELD OF THE INVENTION

The present invention relates to a method and a communications system for the exchange of data among at least two users who are in contact with one another via a bus system, wherein the data are included in messages which are transmitted by the users via the bus system, and a specifiable priority is assigned to each message. The present invention also relates to a bus system for the exchange of data among at least two users of a communications system. In addition, the present invention relates to a storage element for a user, e.g., a control unit, of a communications system, which is in contact with at least one additional user for the exchange of data via a bus system, which storage element stores a computer program which is executable on a computing element of the user.

BACKGROUND OF THE INVENTION

The networking of control units, sensors and actuators using a communications system has increased greatly in recent years in motor vehicle manufacturing. In this context, of main concern is to achieve synergism effects by the distribution of functions to several control units. In this connection, the term distributed systems is used. Communications among the various users (e.g., control units, sensors and actuators) of the communications system take place increasingly via a bus system. The communications traffic on the bus system, access and reception mechanisms, as well as error handling are governed via a protocol.

In the motor vehicle field, the so-called Controller Area Network (CAN) protocol has been established. This is an event-driven protocol, i.e. protocol activities such as transmitting a message are initiated by events which have their origin outside the communications system. Unique access to the communications system is solved by a priority-based bit arbitration. The presupposition for this is that a unique priority is assigned to each message. The CAN protocol is very flexible, and adding additional users and messages is possible as long as free priorities (message identifiers) are still available.

In the case in which the average utilization of the bus system is relatively low, the probability that a user who wishes to transmit a message can indeed transmit its message at once or within a very short latency period, is very high. Since CAN bus systems are typically laid out in such a way that the average utilization of the bus system is low enough, this means that, as a rule, a very rapid access to the bus system is a given. However, the worst case scenario from the point of view of the communications system, namely that all users permanently wish to transmit, produces an infinitely long latency period, at least for those messages whose priority is relatively low. Therefore, a communications system having a CAN bus system is very well suited for the normal operation (very high probabilities for short latency periods), but less well suited for the worst case scenario (low, finite probabilities for very long latency periods).

Another protocol known from the related art is the so-called time-triggered protocol for Class C (TTP/C), which is a purely time-controlled, and thus a deterministic protocol in which redundancy is predefined in a fixed manner. All communications activities on the bus system are strictly periodic. Protocol activities such as transmitting a message are triggered only by progress in (global) time. Access to the communications system is based on the apportionment of time periods during which a user has an exclusive transmission right. The protocol is comparatively inflexible, and adding new users is only possible when the respective time periods were left free ahead of time. The probability that a user obtains access to the bus system when it wishes to do so is independent of the current utilization of the bus system. The latency period is only a function of the distance in time to the next transmitting time. Since the access request of a user is created outside the influence of the communications system (is asynchronous to it), the latency period between access request and authorization to transmit is equally distributed over the entire time interval between two sending times. This probability distribution is very much broader than in the CAN protocol, i.e. the probability of gaining access to the bus system after a very short time is clearly lower. For this, this distribution is localized, and the probability of very long latency periods is zero. The normal case and the worst case scenarios are the same, and, in contrast to the CAN protocol, an upper limit may be stated for the maximum latency period. With that, the TTP/C protocol is suitable for applications in which the worst case scenario has to be tolerated, even if along with that (slight) restrictions have to be accepted for the normal case. Some fields of application of the time-controlled TTP/C protocol are applications in safety-relevant fields (e.g. steer-by-wire, brake-by-wire or generally X-by-wire in motor vehicles) or applications in which the difference between the normal case and the worst case is not great.

Moreover, a possibility of designing a time-controlled protocol more flexibly is known from the prior art. In this case, the entire protocol operates in a time-controlled manner, but certain time ranges are reserved for an event-driven message transmission. Depending on how access within the event-driven time ranges is regulated, the treatments of the normal case and application-specific individual cases may be improved, without the loss of the fundamental ability to treat the worst case. The fundamental orientation of such a communications system is a time-controlled one, and the event control proceeds within the time control in the reserved time ranges. One bus system that works in this manner is the so-called byte flight bus, or the SI bus.

The present invention relates to both an event-driven and a deterministically controlled bus system. Bus systems are likewise included which represent a combination of an event-driven and a deterministic bus system.

It is an object of the present invention, in a data exchange via a bus system, to enable a rapid access to the bus system in the normal case and ensure a finite latency period for the messages to be transmitted in the worst case.

SUMMARY OF THE INVENTION

In order to achieve the above-noted object, the present invention provides that the priorities assigned to the messages be dynamically changed during the operation of the bus system. By the dynamic modification of the priorities in an event-driven bus system, it is ensured that a finite latency period is able to be guaranteed for each message. This comes about while keeping up most of the flexibility advantages of an event-driven communications system. Within the scope of the fundamental limitation of the event-driven protocol under consideration, the communications system is able to be extended arbitrarily without users that are already present (from the point of view of the communications system) having to find out about the extension.

In accordance with the present invention, it is proposed that:

the set of all messages is subdivided into equivalence classes; and during the operation of the bus systems, the priorities of the messages are dynamically modified within an equivalence class.

The priorities of the messages within one equivalence class are preferably modified cyclically. By the modification of the priorities, an access authorization is generated, but it is not required that each user has to avail itself of its transmission authorization. This permits a clear improvement in the normal case, in which not every user always wants to transmit something, without the worst case, in which every user always wants to transmit something, being restricted in its treatment ability.

According to one example embodiment of the present invention, it is proposed that:

the set of all messages is subdivided into equivalence classes;

a priority is assigned to each equivalence class, which preferably corresponds to the highest priority of a message in the equivalence class; and during the operation of the bus systems, the priorities of the equivalence classes are dynamically modified.

The priorities of the equivalence classes preferably alternate according to a cyclical scheme, which, to be sure, guarantees that each equivalence class, at least once within a cycle, receives transmitting authorization, but not each equivalence class equally often.

The priority of a message within an equivalence class, after the transmission of the message, may be set to the lowest possible priority value within the equivalence class. After any message has been transmitted on the bus system, a dynamic modification of the priorities of the messages within that particular equivalence class sets in, to which the transmitted message is assigned. Consequently, for a message the priority within its equivalence class remains unchanged if a message of another equivalence class was transmitted. If a message of the same equivalence class was transmitted, the priority of the message within the equivalence class may change according to the following algorithm:

After the transmission of a message of the same equivalence class, the priority of the messages within an equivalence class, that were not transmitted, is increased by a value which is ascertained from a number of maximum possible priorities in the equivalence class minus the priority of the transmitted message plus one, the result being interpreted modulo the number of the maximum possible priorities in the equivalence class. Let us assume that the priorities for k possible messages in an equivalence class are, in descending sequence, k, . . . , 1. Of the k possible priorities, currently only $j \leq k$ are used, i.e. the equivalence class includes only j messages. In the case of a priority k-r of a message that was just sent, the priority of every other message in the same equivalence class is increased by a value r+1, and the result is interpreted modulo k.

This cyclical shift of the priorities, after the transmission of a message of the same equivalence class, assures that each message either has the highest priority within the equivalence class at any point in time, or it had already been transmitted before. Not all possible priorities actually have to be "occupied" by messages. No transmitting user has to know of another user in its equivalence class, since the priority shift is determined only by one's own priority and the priority of the message that was just transmitted.

All messages within an equivalence class are handled immediately. In the method according to the present invention, the time between two subsequent transmission times of a message in the worst case is equal to a corresponding time in a time-controlled communications system; however, as a general matter, it is shorter. The addition of new messages takes place with no problem, and no other user needs to be notified. The same is true for the modification of the length of the messages transmitted via the bus system. However, just as in the case of a corresponding modification of the structure in a time-controlled communications system, this has an influence on the latency period of other messages of the observed equivalence class in the worst case. Still, this influence is finite, calculable, and even in the worst case just as great as the corresponding influence in the case of a time-controlled communications system. The worst case, and thus a de facto time-controlled behavior, may be forced by introducing compulsory transmission into the protocol on which the method according to the present invention is based.

In principle, the assignment of the equivalence classes to certain equivalence class priorities is independent of the assignment of the messages within an equivalence class to certain message priorities. But a message, for which a latency period guarantee is to be given, has to occur in an equivalence class in which it is ensured, by the priority shift, that it also regularly obtains the right to transmit. It is advantageous if the priority of the equivalence classes is implicitly predefined via the priority of the messages occurring in it. This may be done, for example, by subdividing the priority of the messages into two parts. The first part of the priority of a message characterizes the priority of the equivalence class to which the message is assigned, and a second part indicates the priority of the message within the equivalence class. The first, significant part of a two-part priority is thus interpreted as equivalence class priority and the second part of the priority is at least partially interpreted as message priority. It should be noted that the following always applies: A message having a higher equivalence class priority obtains preferred transmitting authorization, independently of what the priority of the message is within the equivalence class.

The above-described algorithm for the priority shift of the message priorities has an influence only upon the second part of the priority of a message. Below, more detail is provided on the priority shift of the equivalence class (EC) priorities.

The priority shift of the EC priorities are based on the following scheme. The assumption is that there are n different equivalence classes. If we assume an 8-bit length of the priority and further assume that in the first four (significant) bits the equivalence class priority and in the remaining four bits the message priority is stored, then $n=2^4=16$. Moreover, the following assumptions are met:

1. An equivalence class priority is a number couple (i, j)
2. At any one time, an equivalence class can have only one priority. It is either (i, 0) or (0, −i), where i=1, . . . , n. In this context, the i values are the same in both cases, i.e. a priority change of an equivalence class is able to take place only from (i, 0) to (0, −i) or vice versa. The equivalence class is therefore denoted as i.
3. Priority (i, 0) is higher than any priority (0, −j). Priority (j, 0) is higher than (i, 0), if j>i. However, (0, −j) is higher than (0, −i) if j<i.

The modification of the priorities is based on predefinable starting values. The starting values of the priorities must be known for each message. Subsequently, all priorities have to be reset to the starting values as soon as the system bus is free, i.e. no message is written onto the system bus, even though the possibility for access for the message is present. In particular, this permits a comparatively simple initialization.

According to the present invention, it is also provided that, during the operation of the bus system, the priorities of the equivalence classes be dynamically modified according to the following scheme:

If the priority of an equivalence class is (i, 0) and the EC priority of a transmitted message is (j, 0), the priority (i, 0) of the equivalence class is maintained if j>i, and the priority of the equivalence class is reduced to (0, −i) if j≦i.

If the priority of an equivalence class is (i, 0) and the EC priority of a transmitted message is (0, −j), the priority of the equivalence class is always reduced to (0, −i).

If the priority of an equivalence class is (0, −i) and the EC priority of a transmitted message is (j, 0), the priority (0, −i) of the equivalence class is maintained if j>i, and the priority of the equivalence class is increased to (i, 0) if j<i.

If the priority of an equivalence class is (0, −i) and the EC priority of a transmitted message is (0, −j), the priority (0, −i) of the equivalence class is maintained if j≧i, and the priority of the equivalence class is increased to (i, 0) if j<i.

The priority of an equivalence class is fixed at (i, 0) if no message is transmitted even though the system bus is free.

According to this embodiment, it is also provided that the priority of an equivalence class be reduced if a message of the equivalence class has been transmitted or could have been transmitted. The priority of an equivalence class is maintained if a message of the equivalence class could not have been transmitted, independently of whether the priority of the equivalence class was high or low. The priority of an equivalence class is increased if a message of the equivalence class could only have been transmitted if the equivalence class had had the high priority.

According to one embodiment of the present invention it is provided that compulsory transmission be introduced for each user of the communications system. A communications controller of a user has to observe compulsory transmission if, at transmitting authorization, in each case it has to transmit a message. If compulsory transmission is introduced for each user of the communications system, a completely deterministic structure comes about. This structure corresponds to the simultaneous occurrence of all the worst cases discussed above. Thereby, without great effort, a deterministic structure of the communications system may be implemented, without all communications activities on the bus system having to be known ahead of time.

It is advantageous if at least one of the users transmits dummy messages over the bus system. The messages transmitted within the scope of compulsory transmission may also be legacy or dummy messages if the respective user has not yet performed an update. In order to produce a predefined deterministic communications system, even beyond expansions and modifications, dummy controllers may be specified in one or several users which transmit dummy messages in the equivalence classes for those messages which are still to be kept open for later expansions of the communications system. In the same way, the message length may artificially be increased to a greater or the maximum value, if the determinism is to be held constant not only as to the sequence of messages but also as to time, and beyond modifications.

If compulsory transmission prevails, or if all users always want to transmit, a periodic pattern comes about at the equivalence class level after a short time (at the latest, after the lowest equivalence class has transmitted once). This pattern always has the form n, n−1, n, n−2, n, n−1, n, n−3, . . . . The period of the highest equivalence class having the number n is 2. The period of the second highest equivalence class is 4. That of the (n−1) equivalence class is $2^{i+1}$, . . . and the period of the last two equivalence classes (2 and 1), $2^{n-1}$ and $2^n$. The periods are always given as the number of messages. Thus all equivalence classes periodically gain access to the bus system.

On the message level, if there is compulsory transmission, a strictly periodic transmission pattern is also present. Within one equivalence class everything then takes place cyclically, and overall the period for one message is derived as (period of the equivalence class)×(number of messages in the equivalence class).

In the light of this context, one may calculate the new periods coming about for the modified structure, for modifications of the structure of the communications system, particularly for extensions. An effect of modifications in other equivalence classes is only present if an equivalence class having a higher priority is newly founded or is canceled, if all equivalence classes having a lower priority are canceled, or, only for the equivalence class having the lowest priority, if a new equivalence class having an even lower equivalence priority is introduced. On a time level, additional small fluctuations may also occur which are caused by different message lengths. However, this does not change anything with respect to the deterministic execution of the sequence.

Almost any number of periodic transmitting combinations for the messages of the communications system may be produced using the method according to the present invention. On the assumption that compulsory transmission always prevails, the following may be observed:

a cyclical system (e.g. a time division multiple access (TDMA) system) may be produced, in that all messages are assigned to one equivalence class, a cyclical system may be produced, a certain number of messages being supposed to be simultaneously multiplexed, in that these messages are assigned to a first equivalence class and the remaining messages are assigned to a second equivalence class having a higher priority (such as higher by 1), if two multiplex systems are able to be produced, in that the messages of the first system are assigned to a first equivalence class, the messages of the second system are assigned to a second equivalence class having a higher priority (such as higher by 1) and the remaining messages are assigned to a third equivalence class having a still higher priority.

The method according to the present invention provides various further features. According to one embodiment of the present invention, it is provided that messages are to be combined, without latency period guarantee, in an equivalence class of their own, to which the lowest possible priority is assigned. If there is compulsory transmission, the messages of this equivalence class never get a chance. If there is no compulsory transmission, the messages of this equivalence class are transmitted when there are no other messages to be transmitted. The priorities of the remaining messages should then be set again to the starting value.

According to another embodiment of the present invention, it is provided that messages, whose transmission time is regulated not by the bus system but by applications, be combined in an equivalence class of their own, to which a priority is assigned that is as high as possible, the priority of this equivalence class not being modified during the operation of the bus system. The transmission of these messages also does not produce a priority shift in the remaining messages. The messages are always transmitted when this is required by an application, provided that the messages do not conflict with one another. The remaining messages are transmitted between these messages.

As still another alternative, it is also possible to provide a higher protocol layer which, when there is compulsory transmission, monitors the determinism not only at the level of the message sequence but also at the time level. However, in that case, with respect to modifications in the structure of the communications system, the number of messages and their lengths must then be predefined, possibly by "dummy messages". Besides the monitoring of the correct sequence, this extension also permits monitoring at the time level. With that, particularly good error treatment possibilities are available.

If the equivalence class priorities are modified the same as the message priorities within the equivalence classes, one obtains a scheme which, if there is compulsory transmission, produces the same structure as a TDMA-based system (such as the TTP/C protocol). Although the multiplexing possibility is automatically available in each time slot, a modification in the multiplexing status does not have to be communicated to any of the users. New time slots may also be added or removed without a problem, and message lengths may be modified at any time. In addition, the extension possibilities discussed above exist, so that the resulting protocol is very flexible.

Accordingly, it is provided that the priority of an equivalence class, from which a message was transmitted, is set to the lowest possible priority value after transmitting the message. Furthermore, it is provided that the priorities of the equivalence classes from which no messages were transmitted, after the transmission of a message, be increased by a value which is ascertained from a number of maximum possible priorities in the equivalence class minus the priority of the transmitted message plus one, the result being interpreted modulo the number of the maximum possible priorities in the equivalence class.

Using the method according to the present invention, a guarantee may be given for the latency period of the individual messages, without one having to do without the advantages of event control. The composability of the communications system may be brought to exactly the same state as in time-controlled systems by introducing compulsory transmission and possibly "dummy messages". Without compulsory transmission it is still clearly better than in a purely event-driven communications system, since modifications in other equivalence classes do not influence one's own (worst case) transmitting frequency, and modifications within the equivalence class produce only limited and calculable modifications of the latency period in the worst case.

It is provided that, as a further way of achieving the object of the present invention, the communications system have means for the dynamic modification of the priorities assigned to the messages, during the operation of the bus system.

According to the present invention, it is proposed that the communications system have means for carrying out the method according to the present invention.

In the communications system according to the present invention, the flexibility of an event-driven communications system remains preserved. The extendability of the communications system according to the present invention is just as good as that of a purely event-driven system. Message lengths may be modified and new messages may be added or removed without a problem, without this having to be communicated to a communications controller of a user.

The communications system has a very good control response, normally a substantially better response than a purely time-controlled system. Almost any time-controlled communications systems may be emulated.

The worst case, produced by a single"dummy controller" of the "dummy messages" in the equivalence classes called for, is able to be tested for each partial application. The assignment of the messages to the various users of the communications system is flexible. Furthermore, only very minor hardware modifications are necessary. For generating dynamic priorities, standardized, very simple and cost-effective hardware modules may be used. The same applies to possible compulsory transmission. Access to the bus system still takes place via the priorities. One hundred percent utilization of the bus system is possible. Initialization of the communications system according to the present invention via an event-driven protocol is much less problematic than in the case of a time-controlled protocol.

As a further attainment of the object of the present invention, it is provided that the method according to the present invention be carried out using the bus system.

Of importance is the implementation of the method according to the present invention in the form of a storage element, which is provided for a user, of a communications system, that is in touch with at least one further user via a bus system, for the exchange of data. In this context, a computer program is stored on the storage element, that is executable on a computing element of a user, in particular on a microprocessor, and is suitable for carrying out the method according to the present invention. In this case, the present invention is therefore implemented by way of a computer program stored on the storage element, so that this storage element provided with the computer program represents one embodiment of the present invention, corresponding to the method for whose implementation the computer program is suitable. In particular, an electrical storage medium, for example, a read only memory, a random access memory, or a flash memory, may be used as the storage element.

Finally, the present invention also relates to a computer program which is suitable for executing the method according to the present invention when it is run on a computing unit, e.g., a microprocessor, of a user of a communications system that is in contact with at least one additional user via a bus system, for exchanging data. In this context, the computer program may be stored on a storage element, in particular on a flash memory.

DETAILED DESCRIPTION

Figure 1:
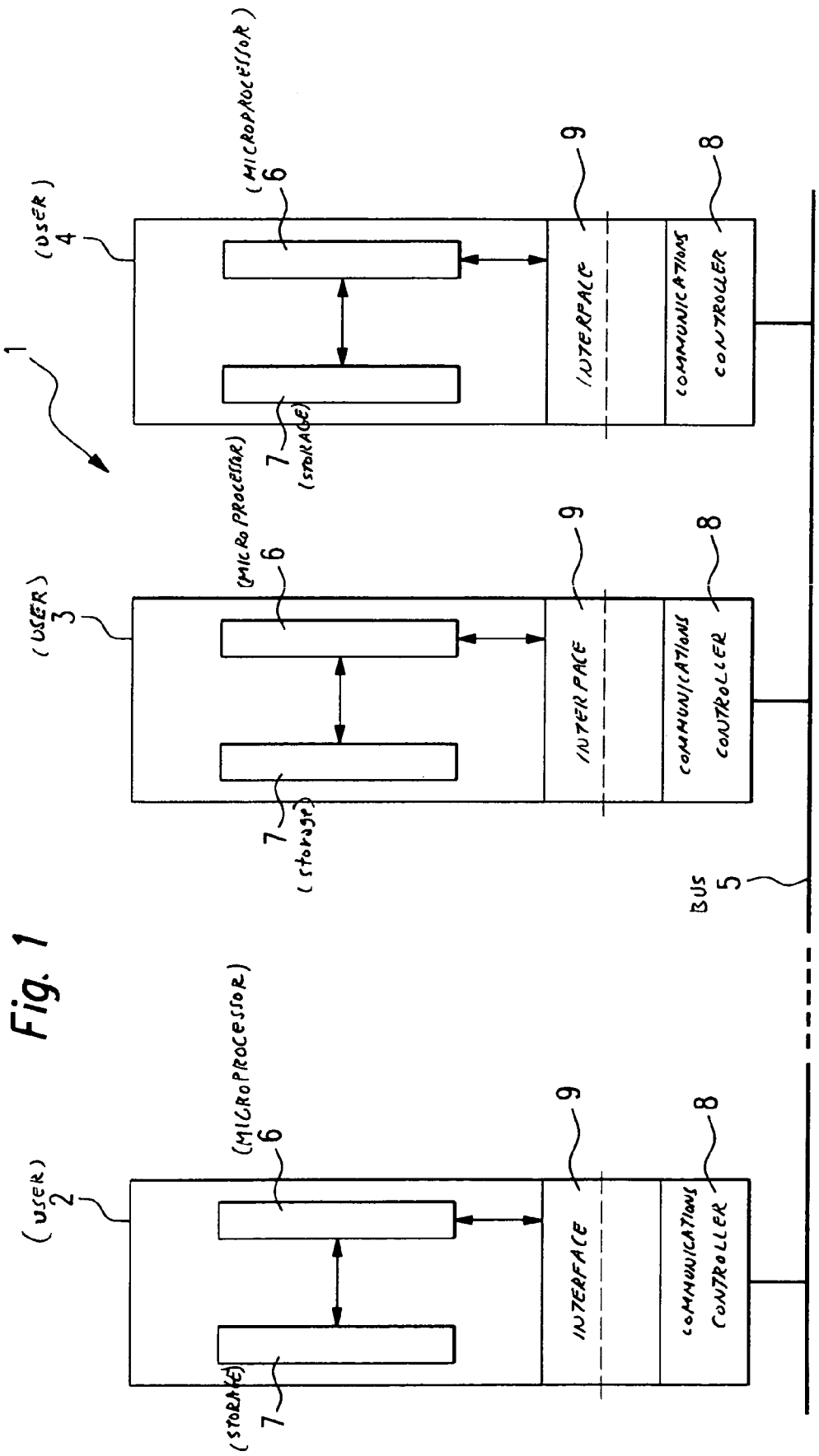
FIG. 1 shows a communications system according to one embodiment of the present invention.

In FIG. 1, a communications system according to the present invention is designated in its entirety by reference numeral 1. The communications system 1 includes several users 2, 3, 4, which are in communication with one another, using a bus system 5 working in distributed fashion for the exchange of data. Users 2, 3, 4 are, for example, control units of a motor vehicle. The data to be exchanged are included in messages which are transmitted by users 2, 3, 4 via the bus system 5. A specifiable priority is assigned to each message.

Users 2, 3, 4 each include a computing unit (so-called process computer) which is designed as a microprocessor 6. A computer program is able to be run on microprocessor 6, and is stored in a storage element 7, e.g., a flash memory. The computer program is suitable for executing the method according to the present invention. The computer program is loaded into microprocessor 6 before or during processing. Users 2, 3, 4 also include a communications controller 8, which is in contact with microprocessor 6 via an interface 9. Communications controller 8 establishes a contact between users 2, 3, 4 and bus system 5.

Figure 2:
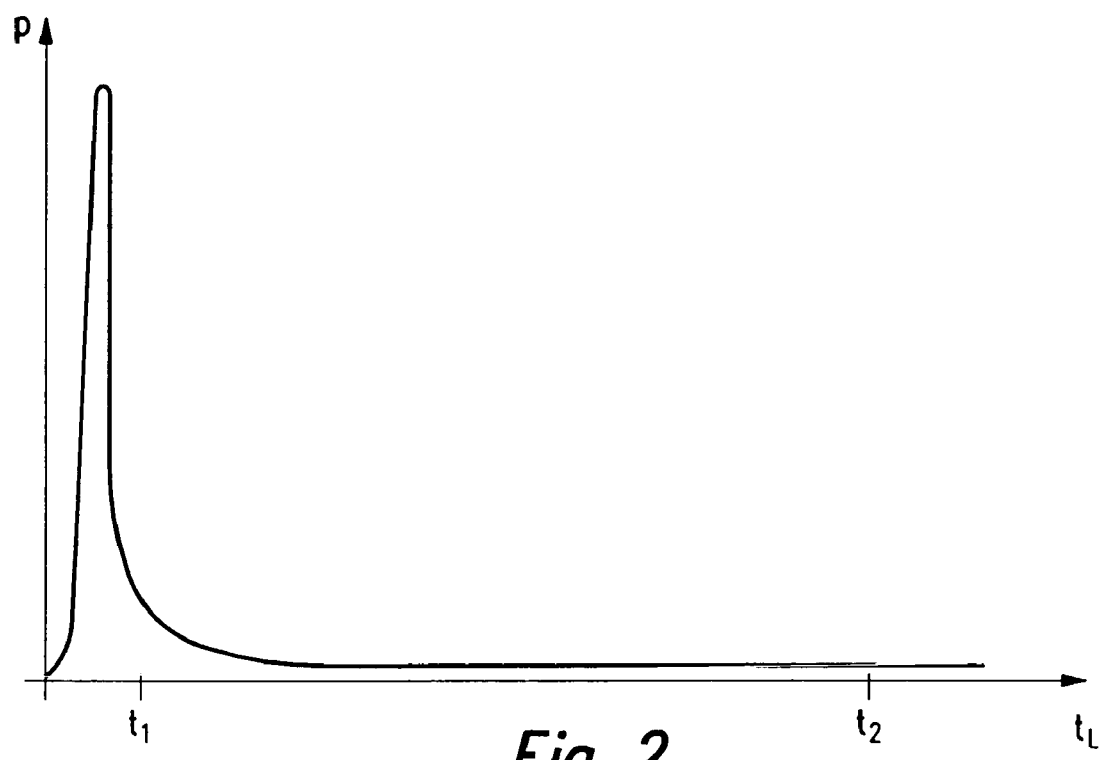
FIG. 2 shows a probability distribution of the latency period in an event-driven communications system.

For bus systems, a probability p may be stated that a certain latency period t is not exceeded, during the transmission of messages. Latency period t is the time which elapses between an access requirement of a user and its transmitting authorization. FIG. 2 shows a probability distribution of latency period t for an event-driven communications system. It may clearly be seen that the probability distribution has a relatively sharp peak in the vicinity of 0. That means that probability p is very high for a very short latency period t less than $t_1$. However, the probability distribution tends to infinity, which means that no maximum latency period t can be guaranteed for the messages to be transmitted. The distribution in FIG. 2 shows that an event-oriented communications system is very suitable for the normal case (very great probability of short latency periods) but less good for the worst case. This may be further intensified if there is an error present in a user which constantly transmits highly prioritized messages, and thereby blocks the bus system. As a result, messages having a low priority are not able to be transmitted over the bus system. The lowly prioritized messages then have an infinitely long latency period. One event-oriented bus system is, for instance, the controller area network (CAN) bus system.

Figure 3:
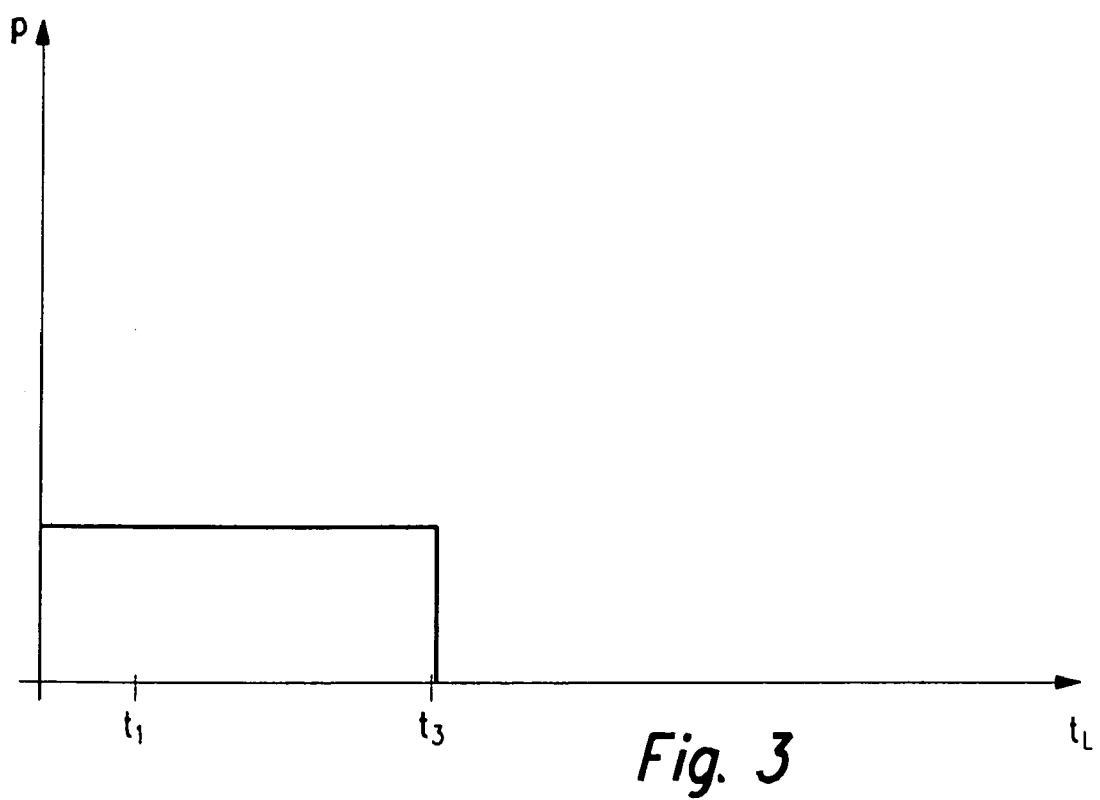
FIG. 3 shows a probability distribution of the latency period in a deterministic communications system.

FIG. 3 shows a probability distribution of latency period t for a deterministic, particularly a time-controlled communications system. It may be clearly seen that the probability p, i.e., that a user obtains access to the bus system and is permitted to transmit a message, when this is required, is independent of the present utilization of the bus system. Latency periods t are only a function of the duration in time to the next transmitting time. Since the access request of a user is created outside the influence of the communications system, and as a rule is asynchronous to it, latency period t between access request and authorization to transmit is equally distributed over the entire time interval between two transmitting times. This distribution is very much broader than in an event-oriented bus system, i.e. the probability p of gaining access to the bus system, after a very short time t less than $t_1$, is clearly lower. The probability distribution is, however, localized, i.e. the probability p for an arbitrarily large latency period is 0. In the normal case and in the worst case the probabilities p are equal, and an upper limit $t_3$ for the maximum latency period may be stated, in contrast to an event-oriented communications system. This being the case, deterministic communications systems are suitable for applications in which the worst case has to be tolerated, even if, along with that, restrictions have to be accepted for the normal case. In particular, applications in safety-relevant areas (X-by-wire systems) or applications in which the difference between the regular case and the worst case is not large, are therefore suitable uses for deterministically controlled protocols. One example of a purely time-regulated protocol is the time-triggered protocol for Class C (TTP/C).

In a data exchange via a bus system, in order to be able to guarantee, on the one hand, in the normal case, a high probability of short latency periods, and on the other hand, in the worst case, a maximum latency period, the present invention provides that the priorities assigned to the individual messages shall be dynamically modified during the operation of bus system 5.

The set of all messages to be transmitted in communications system 1 is subdivided into equivalence classes. A priority is assigned to each equivalence class. The priority of an equivalence class is preferably equivalent to the highest priority of a message in the equivalence class. During the operation of bus system 5, the priorities of the messages are dynamically modified within an equivalence class.

To make clear the priority shift within an equivalence class, let us look at an example. In this context, we start from an equivalence class in which there are k=16 maximum possible priorities. In the equivalence class, j=4 messages are accommodated. At the beginning of the method according to the present invention, the priorities according to Table 1 are assigned to the individual messages $n_1$, $n_2$, $n_3$, $n_4$ of the equivalence class being examined.

TABLE 1

| Starting Values of the Priorities | | | | |
|---|---|---|---|---|
| Priority | 13 | 7 | 3 | 2 |
| Message | $n_1$ | $n_2$ | $n_3$ | $n_4$ |

At the next possible transmission time of the equivalence class being examined, message $n_1$, is transmitted using the highest priority 13. After the transmission of a message of the equivalence class being examined, the priorities of messages $n_1$, $n_2$, $n_3$, $n_4$ of this equivalence class are modified. The priority of transmitted message $n_1$ is set to the lowest possible priority value within the equivalence class, namely 1. The priority k-r of transmitted message $n_1$ is 13. Consequently, r=k−13=16−13=3 is true. The priorities of the remaining messages in the equivalence class, that were not sent, are increased by the value r+1, and the result is interpreted modulo k. Thus, the priorities of the messages within the examined equivalence class change as stated in Table 2.

TABLE 2

| Priority values after the first step | | | | |
|---|---|---|---|---|
| Priority (old) | 7 | 3 | 2 | 13 |
| Priority (new) | 11 | 7 | 6 | 1 |
| Message | $n_2$ | $n_3$ | $n_4$ | $n_1$ |

Message $n_1$, has priority 1, since the old priority value 13 increased by 4 is 17, and 17 modulo k=17 modulo 16 yields 1.

At a subsequent transmitting time of the equivalence class, message $n_2$ does without transmitting, and message $n_3$ is transmitted at a priority k-r=7. In the algorithm, r is now r=k-7=16-7=9. Then the priorities of messages $n_1$, $n_2$, $n_3$, $n_4$ of the equivalence classes are modified as shown in Table 3.

TABLE 3

| Priority values after the second step | | | | |
|---|---|---|---|---|
| Priority (old) | 6 | 1 | 11 | 7 |
| Priority (new) | 16 | 11 | 5 | 1 |
| Message | $n_4$ | $n_1$ | $n_2$ | $n_3$ |

The priorities of messages $n_1$, $n_2$ and $n_4$ are increased by r+1=9+1=10, and the result is interpreted modulo k=modulo 16. The priority of transmitted message $n_3$ is set to the lowest possible priority value within the equivalence class, namely 1. The method according to the present invention is continued as was described, so that a cyclical priority shift of message priorities comes about within the equivalence class.

During the operation of bus system 5, the priorities of the equivalence classes are also dynamically modified. In principle, the prioritization of the equivalence classes is completely independent from the prioritization of the messages within an equivalence class. But a message, for which a latency period guarantee is present, has to be included in an equivalence class in which it is ensured by the prioritization scheme that the equivalence class also regularly obtains the right to transmit. It is particularly advantageous if the priority of the equivalence classes is implicitly given via the priority of the messages occurring in it. This may be implemented, for example, by dividing the priority in two, in a first (significant) part of the priority the equivalence class (EC) priority being included, and in a second part of the priority the message priority within the equivalence class being included. In this context, the following is always true: A message having a higher EC priority obtains preferred transmitting authorization, independently of what the priority of the message is within the equivalence class.

For the dynamic priority shift of the EC priorities the following scheme is provided. We assume that there are n different equivalence classes in the communications system. The priority is represented by a data word having a length of 8 bits, the first (significant) four bits being interpreted as an EC priority and the second four bits being interpreted as a message priority. Consequently, in communications system 1 there are at most $2^4=16$ equivalence classes. Likewise, in an equivalence class at most $2^4=16$ priorities are included.

The priority of a message is a pair of numbers (i, j). At any one time, a given equivalence class can have only one priority. It is either of the form (i, 0) or of the form (0, -i), where i=1, ..., n. The i values are the same in both cases, i.e. the priority change of an equivalence class is able to take place only from (i, 0) to (0, -i) or vice versa. The equivalence class is therefore denoted as i. Priority (i, 0) is higher than any priority (0, -j). Priority (j, 0) is higher than priority (i, 0), if j>i. However, priority (0, -j) is higher than priority (0, -i) if j<i.

For an explanation of the scheme for priority modification, let us examine an equivalence class i. In each equivalence class it only has to be decided whether its own priority should be maintained or not, as a function of the message last transmitted on bus system 5. If the priority is not to be maintained, it has to be decided whether it is to be reduced or increased. The priority modification may be carried out as soon as the priority of the message transmitted over bus system 5 has been read.

If the priority of equivalence class is (i, 0) and the EC priority of a transmitted message is (j, 0) the priority (i, 0) of the equivalence class is maintained if j>i, and the priority of the equivalence class is reduced to (0, -i) if j≦i. If the priority of an equivalence class is (i, 0) and the EC priority of a transmitted message is (0, -j), the priority of the equivalence class is always reduced to (0, -i). If the priority of an equivalence class is (0, -i) and the EC priority of a transmitted message is (j, 0), the priority (0, -i) of the equivalence class is maintained if j>i, and the priority of the equivalence class is increased to (i, 0) if j≦i. If the priority of an equivalence class is (0, -i) and the EC priority of a transmitted message is (0, -j), the priority (0, -i) of the equivalence class is maintained if j≧i, and the priority of the equivalence class is increased to (i, 0) if j<i. If no message is transmitted, even though system bus 5 is free, the priority of the equivalence class is fixed at (i, 0).

In summary, the priority in the equivalence class is reduced if a message from the equivalence class was transmitted or could have been transmitted. The priority of the equivalence class is maintained if a message from the equivalence class could not have been transmitted anyway, independently of the priority of the equivalence class. The priority of the equivalence class is increased if one could have transmitted, had one had a higher priority.

Below, the worst case for the equivalence class frequencies is discussed. An equivalence class j having a current priority (0, -j), according to this scheme, is able to set its priority to (j, 0) only if an equivalence class having j<i gets to transmit at least once, or when system bus 5 is free. If one now examines an equivalence class k, having a current priority (k, 0), which wishes to transmit, it keeps its priority until it has transmitted. Equivalence class k+1 is able to transmit before equivalence class k at most once, because after the transmitting procedure it has priority (0, -(k+1)). The higher priority message, which is able to "liberate" it from this condition, is sent from equivalence class k. Consequently, equivalence class k gets its turn before equivalence class k+1 is able to transmit for the second time. If this argumentation is applied to equivalence class k+1, this means that equivalence class k+2 is able to transmit at most twice before equivalence class k transmits. Thus, assuming a priority (k, 0), equivalence class k+i is able to transmit at most i times before equivalence class k transmits. But if one assumes a priority (0, -k), exactly the same observation applies for the highest priority message which generates the transformation from (0, -k) to (k, 0). Subsequently one must wait until priority (k, 0) is the highest. That is, in the worst case, each equivalence class k+i is able to transmit two i times and any equivalence class which is less than k is able to transmit once, before equivalence class k is able to transmit. As result one obtains for the longest latency period the number of messages lying in between, and thereby the longest period:

TABLE 4 maximum latency period and maximum period

| Equivalence Class | Worst Case Latency Period | Worst Case Period |
|---|---|---|
| n − i | $2^i - 1$ | $2^i$ |

In the method according to the present invention, if one introduces compulsory transmission for each user 2, 3, 4, a completely deterministic structure comes about. A communications controller 8 of a user 2, 3, 4 has to observe compulsory transmission if, upon transmitting authorization, in each case it has to transmit a message. If the corresponding user 2, 3, 4 has not yet arrived at an update, this may also be the old message or an empty message or a "dummy message".

If compulsory transmission prevails, or if all users 2, 3, 4 always want to transmit, a periodic pattern comes about at the equivalence class level after a short time (at the latest, after the lowest equivalence class has transmitted once). This pattern always has the form n, n−1, n, n−2, n, n−1, n, n−3, . . . The period of the highest equivalence class having the number n is 2, the period of the second highest equivalence class is 4, . . . , that of the $(n-i)^{th}$ equivalence class is $2^{i+1}$, and the period of the last two equivalence classes 2 and 1 is $2^{n-1}$ and $2^n$. The periods are always given as the number of messages. Thus all equivalence classes periodically gain access to the bus system 5.

On the message level, if there is compulsory transmission, a strictly periodic transmission pattern is also present. Within one equivalence class everything then takes place cyclically, and overall the period for one message is derived as (period of the equivalence class)×(number of messages in the equivalence class).

Figure 4:
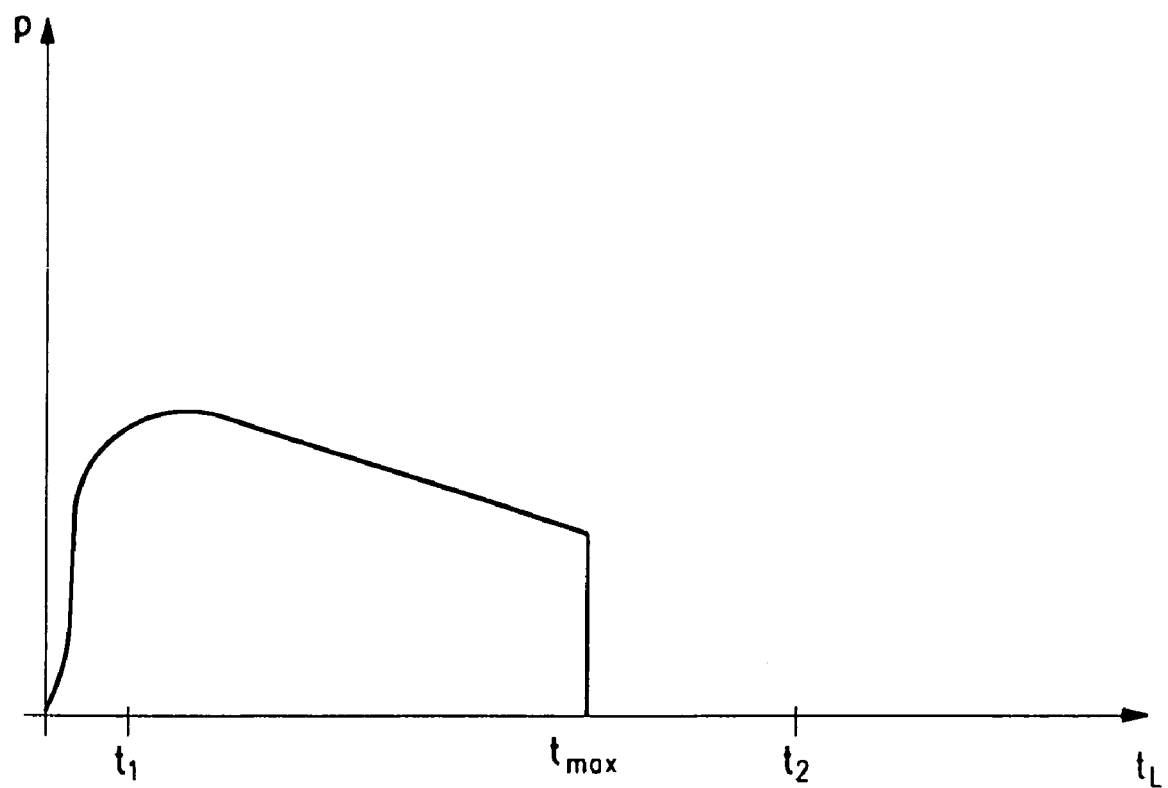
FIG. 4 shows a probability distribution of the latency period in a communications system according to the present invention.

FIG. 4 shows a probability distribution of the latency periods in communications system 1. In this context, a communications system 1 is assumed in which no compulsory transmission prevails. It should be recognized that the probability distribution at low latency periods t less than tsub1 indeed has not such a great peak as in an event-driven communications system (cf FIG. 2). However, the distribution of communications system 1 according to the present invention has a substantially higher value than the probability distribution for short latency periods t less than tsub1 of a deterministic system (cf FIG. 3). For longer latency periods t greater than $t_1$, the method according to the present invention has a substantially higher probability p than the event-driven system. In addition, a maximum latency period $t_{max}$ can be ensured for the messages.

If one assumes a communications system 1 according to the present invention having compulsory transmission, there comes about qualitatively a probability distribution as in a deterministic communications system (cf FIG. 3). However, compared to the deterministic communications system, communications system 1 according to the present invention has the advantage that it is substantially more flexible.

Figure 5:
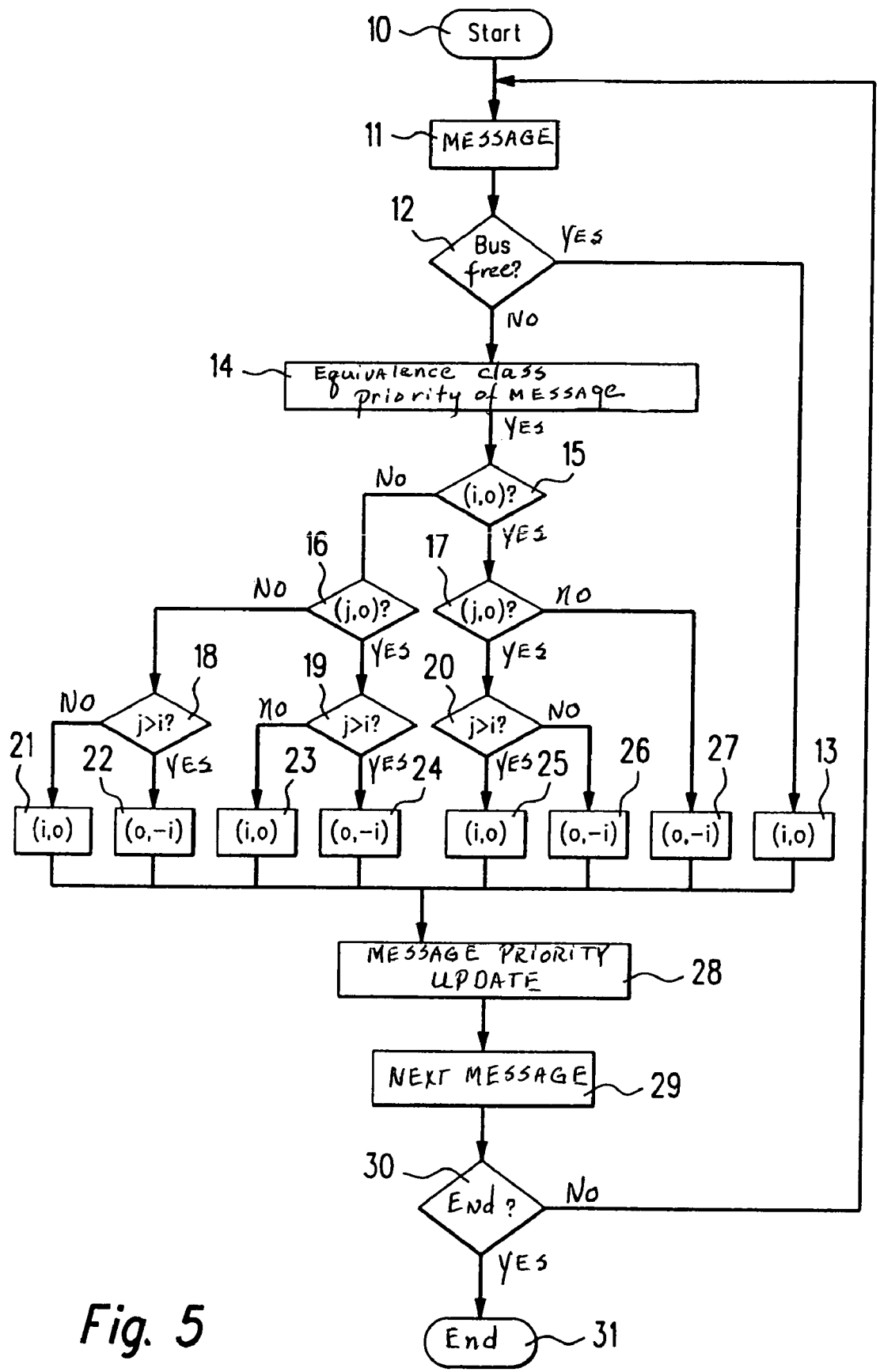
FIG. 5 is a flow-chart illustrating an embodiment of a method according to the present invention for dynamically modifying the priorities of equivalence classes.

FIG. 5 shows a flow-chart of an example embodiment of the method according to the present invention. The method according to the present invention begins in a function block 10. Subsequently, in a function block 11 that particular message is transmitted via bus system 5 which is included in the equivalence class having the highest EC priority and which, within this equivalence class has the highest message priority. In an interrogation block 12 the system then checks whether no message is being transmitted over bus system 5 even though bus system 5 is free. If this is so, the system branches to a function block 13, where the priority of the current equivalence class is set to (i, 0).

If a message has been transmitted over bus system 5, the priority of this message is read in a function block 14. Subsequently, the system runs through a series of interrogation blocks 15 through 20, in order to branch to an appropriate function block 21 through 27, as a function of the priority of equivalence class i and the priority of message j transmitted on bus system 5, and to assign the corresponding EC priority to the current equivalence class.

Figure 6:
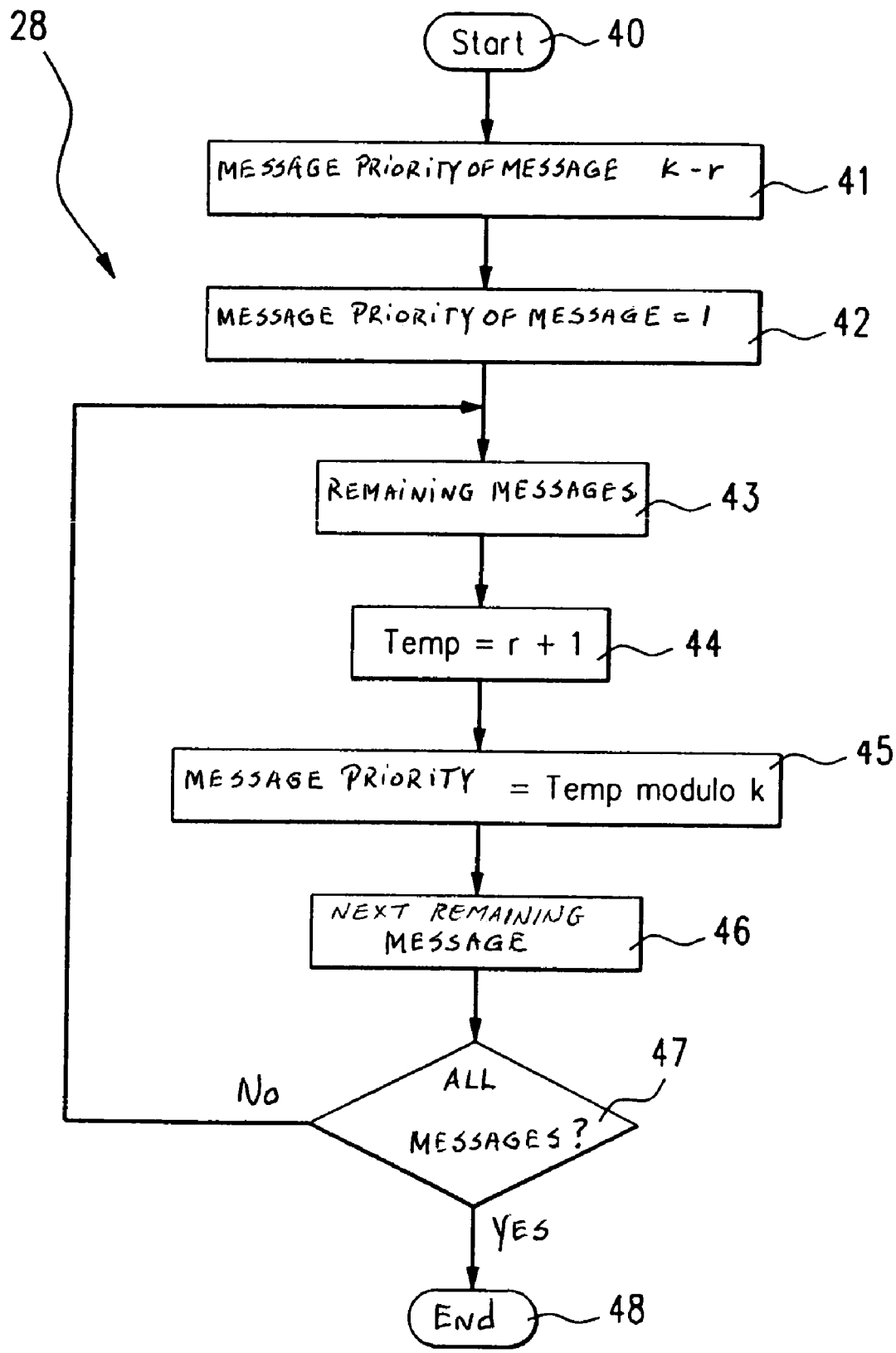
FIG. 6 is a flow-chart illustrating an embodiment of a method according to the present invention for dynamically modifying the priorities of messages within an equivalence class.

In a function block 28 the message priorities of the messages included in the current equivalence class are then modified according to a method described in FIG. 6. In a function block 29 the next highest priority message is then selected. In a query block 30, a check is performed to determine whether the method should be terminated. If not, the message selected in function block 29 is transmitted in function block 11 to bus system 5, and the method starts again at the beginning. If the method is to be terminated, the system branches to the end of the method in function block 31.

The method for dynamically modifying the message priority in the equivalence class from which a message has been transmitted is shown in FIG. 6. The method begins in a function block 40. Subsequently, in a function block 41, the message priority k-r of the transmitted messages is ascertained. In a function block 42 the message priority of the transmitted message is then set to the lowest possible value in the current equivalence class, in the present case, to 1.

The priorities of the remaining messages in the current equivalence class, which were not transmitted, are set to new values in a program loop. In a function block 43 one of the next remaining messages is then selected. Thereafter, in a function block 44, a temporary value Temp=r+1 is formed. In this context, the value r is derived from the difference of the number k of the maximum possible priorities in the current equivalence class and the message priority of the transmitted message ascertained in function block 41. In a function block 45 the message priority of the message selected in function block 43 is then formed from Temp modulo k. In a function block 46 the next of the remaining messages is selected. In a query block 47 the system then checks whether new message priorities have been assigned to all the remaining messages of the current equivalence class. If not, the system branches again to function block 43, and the loop is run through again. If new message priorities have been assigned to all messages, the method is terminated in function block 48.

What is claimed is:

1. A method for exchanging data between at least two user units connected by a bus system, comprising:
    assigning a priority to each message containing data sought to be transmitted by the user units;
    dynamically modifying, during the operation of the bus system, the priority assigned to each message;
    categorizing each message into one of a plurality of equivalence classes;
    assigning a priority to each equivalence class, the assigned priority corresponding to a highest priority of any message in that equivalence class; and
    dynamically modifying, during the operation of the bus system, the priority of at least one particular equivalence class after a message transmission, wherein:

the priority is reduced if at least one of: any message of the particular class was the message transmitted, or any message of the particular class could have been the message transmitted;

the priority is maintained if no message of the particular class could have been transmitted, independent of the priority of the particular class; and the priority is raised if no message of the particular class could have been transmitted, but at least one message of the particular class could have been transmitted if the particular class had had a higher priority.

2. The method according to claim 1, further comprising: dynamically modifying, during the operation of the bus system, the priority of each message within an equivalence class.

3. The method according to claim 2, wherein, after a transmission of a message, the priority of each message within an equivalence class is cyclically modified in such a way that the priority of the transmitted message within the equivalence class is set to the lowest possible priority value within the equivalence class.

4. The method according to claim 2, wherein, after a transmission of a message, the priority of each non-transmitted message within the equivalence class of the transmitted message is increased by a value which is derived by: subtracting the priority of the transmitted message from a number of the maximum possible priorities in the equivalence class, then adding one, the result being interpreted modulo of the number of the maximum possible priorities in the equivalence class.

5. The method according to claim 1, wherein during the operation of the bus system, the priorities of the equivalence classes are dynamically modified as follows:

if the priority of an equivalence class is (i, 0) and the equivalence class priority of a transmitted message is (j, 0), the priority (i, 0) of the equivalence class is maintained if j>i, and the priority of the equivalence class is reduced to (0, −i) if j≦i;

if the priority of an equivalence class is (i, 0) and the equivalence class priority of a transmitted message is (0, −j), the priority of the equivalence class is always reduced to (0, −i);

if the priority of an equivalence class is (0, −i) and the equivalence class priority of a transmitted message is (j, 0), the priority (0, −i) of the equivalence class is maintained if j>i, and the priority of the equivalence class is increased to (i, 0) if j≦i;

if the priority of an equivalence class is (0, −i) and the equivalence class priority of a transmitted message is (0, −j), the priority (0, −i) of the equivalence class is maintained if j≧i, and the priority of the equivalence class is increased to (i, 0) if j<i; and the priority of an equivalence class is permanently set to (i, 0) if no message is transmitted even though the system bus is free.

6. The method according to claim 1, wherein each user unit complies with compulsory transmission of a message upon transmission authorization.

7. The method according to claim 6, wherein at least one of the user units transmits a dummy message over the bus system.

8. The method according to claim 1, wherein messages not having a latency period guarantee are categorized into an equivalence class which is assigned the lowest possible priority.

9. The method according to claim 1, wherein messages having transmission times regulated by applications instead of the bus system are categorized into an equivalence class which is assigned a priority (i, J) that is as high as possible, and wherein the equivalence class is not modified during the operation of the bus system.

10. The method according to claim 1, wherein, after a transmission of a message, the priority of each equivalence class is cyclically modified in such a way that the priority of the equivalence class of the transmitted message is set to the lowest possible priority value.

11. The method according to claim 1, wherein, after a transmission of a message, the priority of each equivalence class from which no message was transmitted is increased by a value which is derived by: subtracting the priority of the transmitted message from a number of the maximum possible priorities in the equivalence class, then adding one, the result being interpreted modulo of the number of the maximum possible priorities in the equivalence class.

12. A communications system, comprising:

a bus system;

at least two user units connected by the bus system for exchanging messages containing data;

a means for assigning a priority to each message and dynamically modifying, during the operation of the bus system, the priority assigned to each message;

means for categorizing each message into one of a plurality of equivalence classes;

means for assigning a priority to each equivalence class, the assigned priority corresponding to a highest priority of any message in that equivalence class; and means for dynamically modifying, during the operation of the bus system, the priority of at least one particular equivalence class after a message transmission, wherein:

the priority is reduced if at least one of: any message of the particular class was the message transmitted, or any message of the particular class could have been the message transmitted;

the priority is maintained if no message of the particular class could have been transmitted, independent of the priority of the particular class; and the priority is raised if no message of the particular class could have been transmitted, but at least one message of the particular class could have been transmitted if the particular class had had a higher priority.

13. The communications system according to claim 12, wherein, during the operation of the bus system, the priority of each message is dynamically modified within an equivalence class.

14. A bus system, comprising:

a bus; and at least two user units connected to the bus, the bus facilitating exchange of messages containing data between the two user units;

wherein a priority is assigned to each message, the assigned priority being dynamically modified during the operation of the bus;

wherein each message is categorized into one of a plurality of equivalence classes;

wherein a priority is assigned to each equivalence class, the assigned priority corresponding to a highest priority of any message in that equivalence class; and wherein, during the operation of the bus system, the priority of at least one particular equivalence class is dynamically modified after a message transmission, wherein:

the priority is reduced if at least one of: any message of the particular class was the message transmitted, or any message of the particular class could have been the message transmitted;

the priority is maintained if no message of the particular class could have been transmitted, independent of the priority of the particular class; and the priority is raised if no message of the particular class could have been transmitted, but at least one message of the particular class could have been transmitted if the particular class had had a higher priority.

15. A computer-readable storage element for a first user unit of a communications system exchanging data via a bus system with at least one additional user unit, contents of the computer-readable storage element causing a computing element of the first user unit to perform the following steps:

assigning a priority to each message containing data sought to be transmitted by the user units;

dynamically modifying, during the operation of the bus system, the priority assigned to each message;

categorizing each message into one of a plurality of equivalence classes;

assigning a priority to each equivalence class, the assigned priority corresponding to a highest priority of any message in that equivalence class; and dynamically modifying, during the operation of the bus system, the priority of at least one particular equivalence class after a message transmission, wherein:

the priority is reduced if at least one of: any message of the particular class was the message transmitted, or any message of the particular class could have been the message transmitted;

the priority is maintained if no message of the particular class could have been transmitted, independent of the priority of the particular class; and the priority is raised if no message of the particular class could have been transmitted, but at least one message of the particular class could have been transmitted if the particular class had had a higher priority.

16. The computer-readable storage element of claim 15, wherein the contents of the computer-readable storage element cause the computing element of the first user unit to perform the following further step:

dynamically modifying, during the operation of the bus system, the priority of each message within an equivalence class.

17. A computer program for execution by a computing element of a first user unit of a communications system exchanging data via a bus system with at least one additional user unit, the computer program performing the following steps:

assigning a priority to each message containing data sought to be transmitted by the user units;

dynamically modifying, during the operation of the bus system, the priority assigned to each message;

categorizing each message into one of a plurality of equivalence classes;

assigning a priority to each equivalence class, the assigned priority corresponding to a highest priority of any message in that equivalence class; and dynamically modifying, during the operation of the bus system, the priority of at least one particular equivalence class after a message transmission, wherein:

the priority is reduced if at least one of: any message of the particular class was the message transmitted, or any message of the particular class could have been the message transmitted;

the priority is maintained if no message of the particular class could have been transmitted, independent of the priority of the particular class; and the priority is raised if no message of the particular class could have been transmitted, but at least one message of the particular class could have been transmitted if the particular class had had a higher priority.

18. The computer program according to claim 17, wherein the computer program is stored on a flash memory.

* * * * *